United States Patent
Weingarten et al.

(10) Patent No.: US 6,393,035 B1
(45) Date of Patent: May 21, 2002

(54) HIGH-REPETITION RATE PASSIVELY MODE-LOCKED SOLID-STATE LASER

(75) Inventors: Kurt J. Weingarten; Daniel Kopf, both of Zurich (CH)

(73) Assignee: GigaTera AG, Zurich (CH)

( * ) Notice: Subject to any disclaimer, the term of this patent is extended or adjusted under 35 U.S.C. 154(b) by 0 days.

(21) Appl. No.: 09/241,684

(22) Filed: Feb. 1, 1999

(51) Int. Cl.[7] .......................... H01S 3/113; H01S 3/098; H01S 3/10; H01S 5/00; H01S 3/091; H01S 3/08

(52) U.S. Cl. .................... 372/18; 372/11; 372/20; 372/49; 372/70; 372/98

(58) Field of Search ............................... 372/11, 18, 70, 372/98, 49, 20

(56) References Cited

U.S. PATENT DOCUMENTS

| | | | | |
|---|---|---|---|---|
| 4,205,278 A | * | 5/1980 | George et al. | 331/94.5 |
| 4,435,809 A | * | 3/1984 | Tsang et al. | 372/20 |
| 5,802,084 A | * | 9/1998 | Bowers et al. | 372/18 |
| 5,987,049 A | * | 11/1999 | Weingarten et al. | 372/70 |

* cited by examiner

Primary Examiner—Frank G. Font
Assistant Examiner—Armando Rodriguez
(74) Attorney, Agent, or Firm—Oppedahl & Larson LLP

(57) ABSTRACT

A passively mode-locked solid-state laser for emitting a continuous-wave train of electromagnetic-radiation pulses, the fundamental repetition rate of the emitted pulses exceeding 1 GHz, without Q-switching has an optical resonator, a solid-state laser gain element placed inside the optical resonator, an exciter for exciting said laser gain element to emit electromagnetic radiation having the effective wavelength, and a saturable absorber for passive mode locking. The laser gain element preferably consists of a laser material with a stimulated emission cross section exceeding $0.8 \times 10^{-18}$ cm$^{-2}$ at the effective wavelength. Typically, the laser gain element is made of Nd:vanadate. The saturable absorber is preferably a semiconductor saturable absorber mirror device. The laser is simple, robust, compact, efficient, and low-cost. It generates a relatively large average power of 100 mW and higher, which is useful for a number of optical probing and detection applications, in a beam which is substantially a fundamental spatial mode.

33 Claims, 6 Drawing Sheets

HIGH-REPETITION RATE PASSIVELY MODE-LOCKED SOLID-STATE LASER

FIELD OF THE INVENTION

This invention relates to lasers, and more particularly to passively mode-locked solid state lasers designed to operate at repetition rates exceeding 1 GHz.

BACKGROUND OF THE INVENTION

Solid-state lasers are known in the art. Their laser gain media are dopant ions incorporated in dilute concentrations in solid hosts. The laser gain medium can be optically excited to emit electromagnetic radiation by impinging a pumping beam on the laser gain medium. High-repetition rate lasers are desirable for a number of applications, such as for use as seed sources for driving radio-frequency photocathodes. These RF photocathodes are then used to inject high-energy electron bunches into a linear accelerator. It is often desirable to have the laser repetition rate operating at the drive frequency of the linear accelerator, which is typically at 2.8 GHz or higher. It is also possible to use high-repetition rate lasers synchronized to the drive frequency of the accelerator in diagnostic tools or in optical-electron interactions after the electrons are fully accelerated.

Other possible applications of high-repetition rate lasers are in the area of telecommunications, photonic switching, and optoelectronic testing. As networks and electronic components continue to increase in terms of bandwidth and clock frequency, optical pulsed laser sources become more important for driving, sensing, and testing of these components. One example of this application for optical clocking of integrated circuits is disclosed in U.S. Pat. No. 5,812,708 (Rao).

Mode locking is a special operation regime of lasers where an intra-cavity modulation (amplitude or phase modulator) forces all of the laser modes to operate at a constant phase, i.e., phase-locked or "mode-locked", so that the temporal shape of the laser output forms a continuously repeating train of short (typically in the range of picoseconds or femtoseconds) optical pulses. The repetition rate of this pulse train is set by the inverse of the laser round-trip time, or equivalently by the free spectral range of the laser, $f_{rep}=c/2L$ where c is the speed of light and L is the cavity length for a standing wave cavity. This repetition rate $f_{rep}$ is termed the fundamental repetition rate of the laser cavity, since this corresponds to only one laser pulse circulating in the cavity per round trip. The repetition rate can be scaled by integer multiples N of the fundamental repetition rate under certain conditions, and this is called harmonic mode locking. In this case, there are multiple laser pulses circulating in the cavity per round trip. The minimum possible pulse width of the laser is nominally set by the line width of the laser transition, following approximately the condition that $t_{min} \geq 0.44/\Delta f$ where $\Delta f$ is the line width of the laser transition. For typical laser materials such as Nd:YAG or Nd:vanadate, the laser line width can support pulses to less than 10 ps. For broader-bandwidth materials such as Nd:glass or Ti:sapphire, pulse widths to below 100 fs and even below 10 fs can be generated.

DESCRIPTION OF PRIOR ART

Mode locked lasers are well known in the state-of-the-art, having been first described in the 1960's (see H. W. Mocker et al., "Mode competition and self-locking effects in a Q-switched ruby laser," Applied Physics Letters, vol. 7, pp. 270–273, 1965). Passive mode locking using a saturable absorber was discovered almost immediately thereafter. Most mode-locked lasers have used active modulators, where the term "active" means that a source of power such as a radio-frequency signal or another electronic signal must be periodically applied to the modulator. Typical active modulators are acousto-optical modulators (AOMs, Bragg cells) or electro-optical (EOMs, Pockels cells). Active modulators can modulate the amplitude (AOMs or EOMs) or the phase (EOMs) of the optical signal to achieve mode locking.

Active mode lockers have the disadvantages of cost and complexity. A typical device requires a precision electro-optical component, plus drive electronics which typically consists of high-power, high-stability RF-signal (for AOMs) or high-voltage (for EOMs) components. Additionally, feedback electronics may be required to stabilize either the drive signal for the modulator and/or the laser cavity length to achieve the necessary stability from the system (cf. U.S. Pat. No. 4,025,875, Fletcher et al., "Length controlled stabilized mode-lock Nd:YAG laser", and Lightwave Electronics, Series 131 data sheet, March 1994).

Active mode locking has been available in commercial lamp-pumped laser systems and more recently in diode-pumped laser systems at repetition rates typically of 100 MHz and extending up to 250 MHz. Research on active mode locking has been done on higher repetition rates, achieving repetition rates of approximately 2 GHz (see K. J. Weingarten et al., "Two gigahertz repetition rate, diode-pumped, mode-locked Nd:YLF laser", Optics Letters, vol. 15, pp. 962–964, 1990), 5 GHz (P. A. Schulz et al., "5-GHz mode locking of a Nd:YLF laser", Optics Letters, vol. 16, pp. 1502–1504, 1991), 20 GHz (A. A. Godil et al., "Harmonic mode locking of a Nd:BEL laser using a 20-GHz dielectric resonator/optical modulator", Optics Letters, vol. 16, pp. 1765–1767, 1991), and more recently 40 GHz (A. J. C. Viera et. al., "Microchip laser for microwave and millimeter-wave generation", IEEE MTT-S IMOC'97 Proceedings). In all cases the systems required an active modulator driven by a stable RF source and an RF amplifier. The highest repetition rates at 40 GHz were achieved with "harmonic" mode locking (see M. F. Becker et al., "Harmonic mode locking of the Nd:YAG laser", IEEE Journal of Quantum Electronics, vol. QE-8, pp. 687–693, 1972), where the modulator is driven at some integer multiple of the fundamental laser repetition rate. This is an additional source of complexity and instability in the laser system. In general we wish to avoid harmonic mode locking if possible.

It is also possible to generate high repetition rates using other laser medium such as rare-earth-doped fiber lasers, and semiconductor lasers. Repetition rates of >10 GHz have been demonstrated in semiconductor quantum well lasers (see U.S. Pat. No. 5,040,183, Chen et al., "Apparatus comprising optical pulse-generating means"), achieving pulse repetition rates even to >100 GHz. However, their approach appears to be limited in terms of average power. Fiber lasers have also been demonstrated to high repetition rates using active or harmonic passive mode locking (see U.S. Pat. No. 5,414,725 Fermann et al., "Harmonic partitioning of a passively mode-locked laser", and S. V. Chernikov et al., "Duration-tunable 0.2–20 ps 10-GHz source of transform-limited optical pulse based on an electro-absorption modulator", Optics Letters, vol. 20, pp. 2399–2401, 1995) Passive mode locking at the fundamental repetition rate, on the other hand, is a much simpler, robust, and lower-cost approach to generating mode-locked pulses. Passive mode locking is also well-established in the state of the art (see A. J. DeMaria et al., "Self mode-locking of lasers with saturable absorbers", Applied Physics Letters, vol. 8, pp, 174–176, 1966). The most significant developments in passive mode locking in the recent years have been Kerr-Lens Mode locking (KLM) (U.S. Pat. No. 5,163,059, Negus et al., "Mode-locked laser using non-linear self-focusing element") for generation of femtosecond pulses from Ti:sapphire and other femtosecond laser systems, and the semiconductor saturable absorber mirror (SESAM) device for generating picosecond and femtosecond pulses in a wide number of solid-state lasers (see U. Keller et al., "Semiconductor saturable absorber mirrors (SESAMs) for femtosecond to nanosecond pulse generation in solid-state lasers," Journal of Selected Topics in Quantum Electronics (JSTQE), vol. 2, no. 3, pp. 435–453, 1996). Passive mode locking relies on a saturable absorber mechanism, which produces either decreasing loss with increasing optical intensity, or similarly an increase gain with increasing optical intensity. When the saturable absorber parameters are correctly adjusted for the laser system, the optical intensity in the laser cavity is enhanced such that a mode-locked pulse train builds up over a time-period corresponding to a given number of round-trips in the laser cavity. Most passively mode locked lasers have been operated at repetition rates of approximately 100 MHz, corresponding to a cavity length of approximately 1.5 m. This cavity length is appropriate for many applications (such as seeding a regenerative laser amplifier) and is also convenient for building laboratory-scale lasers. Work has been done to achieve higher repetition rates, which could be important for telecommunications and optical clocking applications (see U.S. Pat No. 4,930,131, Sizer, "Source of high repetition rate, high power optical pulses", U.S. Pat. No. 5,274,659, Harvey, et. al., "Harmonically mode-locked laser", U.S. Pat. No. 5,007,059, Keller et al., "Nonlinear external cavity mode locked laser"; B. E. Bouma et al., "Compact Kerr-lens mode-locked resonators", Optics Letters, vol. 21, 1996, pp. 134–136; and B. C. Collings et al, "True fundamental solitons in a passively mode-locked short-cavity Cr4+:YAG laser", Optics Letters, vol. 22, pp. 1098–2000, 1997). However, passive mode locking in solid-state lasers has not been readily achieved at fundamental repetition rates beyond 1 GHz. There are a number of reasons for this limitation. First, for a given average power, the pulse energy and thus the peak power in a pulse will decrease as the laser repetition rate increases (given that the pulsewidth also stays constant). For laser relying on peak-power induced non-linearities to achieve passive mode locking (i.e., lasers using KLM) it becomes increasingly difficult to mode-lock at higher repetition rates. In addition, the cavity size decreases in length inversely proportional to the repetition rate, and it becomes more difficult to adequately provide dispersion compensation. As noted, solid-state lasers using KLM have not been reported substantially beyond repetition rates of 1 GHz (see B. E. Bouma et al., "Compact Kerr-lens mode-locked resonators", Optics Letters, vol. 21, 1996, pp.134–136, and U.S. Pat. No. 5,553,093 Ramaswamy et. al., "Dispersion-compensated laser using prismatic end elements").

For passively mode locked lasers using SESAMs for mode locking, the limitation on repetition rate is the onset of Q-switching instabilities (see U. Keller et al., "Semiconductor saturable absorber mirrors (SESAMs) for femtosecond to nanosecond pulse generation in solid-state lasers," Journal of Selected Topics in Quantum Electronics (JSTQE), vol. 2, no. 3, pp.435–453, 1996, and U. Keller, "Ultrafast all-solid-state laser technology", *Applied Physics. B*, vol. 58, pp.347–363, 1994). This has also limited the laser repetition rate to the range of several hundred megahertz typically. Using the technique of coupled cavity mode locking (RPM), a repetition rate of 1 GHz was demonstrated (see U. Keller, "Diode-pumped, high repetition rate, resonant passive mode-locked Nd:YLF laser", Proceedings on Advanced Solid-State Lasers, vol. 13, pp.94–97, 1992). However this is a much more complicated laser due to the additional laser cavity which has to be carefully aligned with the main laser cavity.

It would be advantageous to achieve repetition rates greater than 1 GHz for many applications such as synchronization with linear particle accelerators (which typically operate at 3 GHz or higher), use in high-speed telecommunications networks as optical pulse sources, and optical clocking of circuits and system in the gigahertz range. These lasers may also find applications in measurement applications such as precision ranging, optical testing of photodetectors and other optically triggered components, and electro-optical test methods on electronics and integrated circuits.

SUMMARY OF THE INVENTION

An object of this invention to provide a simple, robust, passively mode locked laser with repetition rates of greater than 1 GHz, extending as high as possible (up to approximately 50 GHz or higher). It is a further object of the invention to provide a laser system which generates a relatively large average power of 100 mW and higher, which is useful for a number of optical probing and detection applications, in a beam which is substantially a fundamental spatial mode, and which is pumped by a semiconductor laser ("diode-pumped") so that it is compact, efficient, and low-cost.

Yet another object is to accomplish the foregoing with semiconductor saturable absorber mirrors (SESAMs) which further simplifies the design.

According to the invention, a passively mode-locked solid-state laser can be caused to emit a continuous-wave train of electromagnetic-radiation pulses characterized by an effective wavelength, the fundamental repetition rate of the emitted pulses exceeding 1 GHz, without Q-switching, under certain conditions described below. The laser comprises an optical resonator, a solid-state laser gain element placed inside said optical resonator, means for exciting said laser gain element to emit electromagnetic radiation characterized by the effective wavelength, and means for passive mode locking comprising a saturable absorber. The laser gain element preferably consists of a laser material with a stimulated emission cross section exceeding $0.8 \times 10^{-18}$ cm$^{-2}$ at the effective wavelength; typically, the laser gain element is made of Nd:vanadate. The saturable absorber is preferably a semiconductor saturable absorber mirror device.

The method for emitting a continuous-wave train of electromagnetic-radiation pulses characterized by an effective wavelength, the pulses being emitted with a fundamental repetition rate exceeding 1 GHz, comprises the steps of exciting a laser gain element to emit electromagnetic radiation characterized by the effective wavelength, said laser gain element being placed inside an optical resonator, recirculating said electromagnetic radiation in said optical resonator, and passively mode locking said electromagnetic radiation using a saturable absorber. When the conditions necessary to avoid the Q-switching instabilities in passively mode-locked lasers are examined more carefully, the following stability condition can be derived:

$$(F_{laser}/F_{sat,laser}) \cdot (F_{abs}/F_{sat,abs}) > \Delta R \quad (1)$$

where $F_{laser}$ is the fluence in the laser material, $F_{sat,laser}=h\upsilon/\sigma_{laser}$ is the saturation fluence of the laser material, h is Planck's constant, $\upsilon$ is the center laser frequency, $\sigma_{laser}$ is the laser cross-section parameter (see W. Koechner, Solid-State Laser Engineering, 4$^{th}$ Edition, Springer-Verlag New York, 1996), $F_{abs}$ is the fluence on the absorber device, $F_{sat,abs}=h\upsilon/\sigma_{abs\text{-}eff}$ is the effective saturation fluence of the absorber, where $\sigma_{abs\text{-}eff}$ is the effective cross-section parameter of the absorber device, and $\Delta R$ is the modulation depth of the absorber device. This equation can be used to scale a laser for operation at higher repetition rates. If all else remains constant (i.e., mode size in laser material and on the absorber, average power, and pulsewidth), as the repetition rate increases, the left-hand term decreases due to decreasing pulse energy. It is possible to avoid Q-switching under this condition by arbitrarily decreasing the modulation depth $\Delta R$. However, below a certain modulation depth, the absorber will not have a strong enough effect to start and sustain mode locking.

For further clarity we simplify Eq. (1) to the following:

$$S_{laser} \cdot S_{abs} > \Delta R \qquad (2)$$

where $S_{laser}$ is the fluence ratio in the laser material, and $S_{abs}$ is the fluence ratio on the absorber. This reduced notation allows us to simplify the further discussion. To achieve the maximum figure of merit, one can change the laser design to increase the fluence ratio $S_{laser}$ in the laser material, or to increase the fluence ratio $S_{abs}$ in the absorber.

First, we consider increasing the absorber fluence ratio $S_{abs}$. There are two limits to the fluence level on the absorber. First, a very high fluence can result in optical damage. Damage levels of SESAM absorbers have been measured in the range of 30 mJ/cm$^2$. Secondly, a very high fluence (but still below the damage threshold) may cause the laser to operate with multiple pulses per round trip (i.e., a form of harmonic mode locking). This may be desirable as a method to increase the repetition rate of the laser, however, it may result in decreased operation stability of the laser. Typical fluence levels on the SESAM can range from approximately $F_{sat,abs}$ to as high as $50 \cdot F_{sat,abs}$. (representative saturation fluence $F_{sat,abs}$ are approximately 50 to 100 $\mu$J/cm$^2$). It is also important to consider the saturation fluence of the SESAM, $F_{sat,abs\text{-}eff}$. This parameter is effectively set by the semiconductor absorber material cross-section value ($\sigma_{abs}$). Although it is possible to change the effective saturation fluence of the SESAM device by scaling the design so that the absorber sees a different field intensity, this will not allow us to increase the fluence ratio above the limits set by material damage or multiple pulsing. Possible methods to reduce the absorber saturation fluence would be to use the exciton effect. Note that it is possible to tune the exciton effect, which has a relatively narrow optical frequency range, by temperature tuning the material. It is thus possible to optimize the modulation depth of the SESAM device by temperature tuning the entire SESAM device while it is in the laser cavity to maximize its modulation depth. This is advantageous as it allows us to fine tune the passive mode-locking start-up for maximum repetition rate, i.e., we can use a device with a low modulation depth, but tuned so that it just provides enough modulation to start the passive mode locking, but not enough to start Q-switching the laser.

Another possible method to reduce the saturation fluence is to use a different absorber material with a fundamentally different cross-section value. Currently this is restricted due to the fabrication nature of the SESAM devices, which typically relies on InGaAs or similar semiconductor combinations with various doping levels of the Indium concentration to achieve absorption at the desired wavelength. This material system has a roughly constant saturation cross section.

There are a number of material parameters that can be optimized to improve the SESAM fluence ratio. First, by proper doping of the SESAM absorber, the modulation depth can be increased for a given absorber thickness, conversely allowing for a shorter absorber for maintaining a constant modulation depth, which allows for reduced fixed loss, which results in more efficient laser operation. Secondly it is possible to passivate the surface of the SESAM device to improve its damage threshold, allowing for operation of the SESAM with a higher fluence.

There are also a number of techniques to optimize the design of the SESAM device for maximizing the repetition rate of the laser. Let us review the basic design issues with SESAMs. Basically they are a combination of non-absorber dielectric layers which are typically arranged in quarter-wave and half-wave layers to form a mirror structure. The absorber layer can be imbedded in any of the quarter-wave or half-wave layer structures, as long as the entire filter structure is properly designed, without substantially degrading the reflectivity of the mirror structure. Note that it is also possible to design the mirror structure with "chirped" layer thicknesses to introduce increased operating bandwidth or to introduce some dispersive function of the mirror.

The position of the absorber in the structure can play a key role in setting the device parameters. Basically the saturation fluence of the device is set by the formula $$F_{sat,eff}=F_{sat,mat}/\zeta \qquad (3)$$

where $F_{sat,eff}$ is the effective saturation fluence of the SESAM, $F_{sat,mat}$ is the saturation fluence of the absorber material, and $\zeta$ is a finesse factor (see U. Keller, "Ultrafast all-solid-state laser technology", *Applied Physics. B*, vol. 58, pp. 347–363, 1994) given by the SESAM design. There are several ways to influence $F_{sat,eff}$. By positioning the absorber in a region of low optical field, we can increase the effective saturation fluence of the device, and correspondingly reduce the modulation depth. The modulation depth can be independently adjusted by the absorber thickness. Note that as the absorber thickness becomes comparable to the length of the standing optical wave in the device, the effective saturation fluence will also start to increase. One technique to increase the modulation depth while maintaining a lower effective saturation fluence is to position multiple absorber layers at the peak of the standing wave in more than one of the appropriate layers.

Note it is also possible to increase the effective saturation fluence of the SESAM by adding reflective layers on top of the layer holding absorber. Since certain dielectrics have higher damage threshold than semiconductor materials, it may be advantageous to have the top layers of the structure with damage-resistant dielectrics, then the absorber layer, then a semiconductor dielectric structure underneath.

It is also possible to improve the damage threshold of semiconductor devices by appropriate passivation of the top layer. This passivation layer prevents oxygen and other contaminants from migrating into the semiconductor structure, and also holds in place any contaminants that may already exist on the face of the device. At the same time, the passivation can be made very thin so that it is optically transparent and does not substantially affect the reflectivity and absorption structure of the device. A typical passivation layer for example would be to deposit 2 nm of Si on the final face of the SESAM device before it has been removed from its fabrication chamber and exposed to possible contaminants. Passivation techniques for semiconductor laser devices have been disclosed by U.S. Pat No. 5,144,634, Gasser et. al., "Method for mirror passivation of semiconductor laser diode".

Next we consider increasing the fluence ratio in the laser material. The main limit to increasing the fluence of the laser beam in the crystal will be limited by mode-matching requirements set by the pump laser (see D. Kopf et al., "High-average-power diode-pumped femtosecond Cr:LiSAF lasers", Applied Physics B, vol. 65, pp. 235–243, 1997). Although it is possible that damage to the laser crystal could occur at very high fluence levels, normally we do not operate near to this limit (approximately 100 mJ/cm$^2$ for a 10 ps pulse in Nd:YAG). However in contrast to the saturation fluence in the SESAM, we can change the saturation fluence by changing the laser crystal. Typical laser crystals used in the past have included Nd:YAG, Nd:YLF, and Nd:vanadate. Table I shows representative values of emission cross-sections of various neodymium hosts at approximately 1064 nm. Comparing the laser cross-section a as given in Table I, we see that Nd:vanadate has a substantially higher cross-section, and therefore a lower saturation fluence. Therefore this crystal is one of the best choices for minimizing the Q-switching figure of merit (FOM) compared to other typical Nd-doped crystals.

TABLE I

| Material | Nd:YAG | Nd:YLF (1047 nm) | Nd:YVO$_5$ (vanadate) | Nd: glass | Ti:sapphire (~800 nm) |
|---|---|---|---|---|---|
| Cross-section σ (cm$^{-2}$) | 6.5 × 10$^{-19}$ | 1.8 × 10$^{-19}$ | 25 × 10$^{-19}$ | 0.4 × 10$^{-19}$ | 3.8 × 10$^{-19}$ |

The next consideration is the fluence of the laser mode in the laser crystal. Here the key limitation is given by the conditions set by proper mode-matching. For efficient optical pumping, the overlap of the pumping beam with the laser mode must generally be high over the absorption length in the crystal. For this purpose, it is known to set the confocal parameter of the (non-ideal) pumping beam approximately equal to the absorption length of the crystal, which is called mode-matching. This condition means that the pump beam waist diameter must be above a certain lower limit. The laser-mode waist size is then matched to the pumping-beam waist size. The latter must carefully be optimized; if it is too small, higher-order spatial modes are excited in the laser resonator, and if it is too large, the small-signal gain decreases, the laser threshold increases, and the laser is either not very efficient or does not even reach threshold. Note that mode-matching reduces the saturation fluence in the laser crystal, i.e., improves the laser fluence ratio. (See D. Kopf et al., "High-average-power diode-pumped femtosecond Cr:LiSAF lasers", Applied Physics B, vol. 65, pp. 235–243, 1997.)

Nd:vanadate has another key advantage to mode-matching—it has a very strong and broad pump absorption at the pump wavelength relative to Nd:YAG or Nd:YLF. In addition it can be doped by Nd to levels exceeding 3%, which further allows for increased pump absorption. A typical absorption length in 3%-doped Nd:vanadate is approximately 100 μm. This allows us to achieve mode-matching with a strongly focused pump laser, allowing for a minimum possible pump diameter and therefore a minimum possible laser mode diameter in the laser crystal. This in turn allows for a substantially higher laser fluence in the laser crystal. Combined with the larger cross-section and lower saturation fluence, these effects result in a substantially increased fluence ratio in the laser, and therefore an improved figure of merit against the onset of Q-switching instabilities compared to Nd:YAG or other conventional laser materials.

In addition it is desirable to use a laser diode with the highest possible spatial brightness, where brightness is understood to be the amount of light emitted in proportion to the product of solid-angle of the light times the emitting aperture area. For a given wavelength and power level, the highest brightness light is "diffraction limited", which corresponds to light with the minimum possible solid angle from a given emitting area. This is also characterized by the M-squared factor ($M^2$) (see for example M. W. Sasnett, "Propagation of multimode laser beams—the $M^2$ factor," in *The Physics and technology of laser resonators,* D. R. Hall, P. E. Jackson, Eds., NY 1989, pp. 132–142) When $M^2$=1, the light is diffraction limited. Larger values of $M^2$ indicate how many times the light is above the diffraction limit. A representative example of current state-of-the-art for high brightness laser diodes is a device emitting at 808 nm, giving up to 2 W of average power from an aperture 100 μm (in the sagittal plane) by 1 μm (in the tangential plane), with a beam divergence of about 10° by 35° respectively, resulting in an $M^2$ factor of about 20 by 1, respectively. High brightness laser diodes allow the conditions in Eq. (2) to be more easily achieved and/or higher output coupling of the laser resulting in higher average output power.

These results can be generalized. It is possible to achieve higher laser repetition rates with a passively mode-locked laser system by decreasing the laser mode size as much as possible in the laser crystal as limited by mode-matching of the pump diode, choosing the highest brightness pump diode available, decreasing the laser saturation fluence by choosing a laser material with the maximum possible cross-section and a large pump absorption coefficient, then maximizing the fluence on the absorber, and minimizing the saturation fluence of the absorber if possible.

The remaining possibility is to decrease the modulation depth of the absorber ΔR. As mentioned, the key limitation here is the minimum modulation depth required to start and sustain mode locking. Unfortunately there is not yet a simple analytical form to evaluate the minimum modulation depth required for starting the mode locking process. However it has been observed that the starting threshold depends on several effects, such as the laser design and how many times it is pumped above threshold, and the effect of spatial hole burning due to the positioning of the laser material in the laser cavity (B. Braun et al., "Continuous-wave mode-locked solid-state lasers with enhanced spatial hole-burning, Part I: Experiments,"*Applied Physics B,* vol. 61, pp. 429–437, 1995). We will discuss each of these effects in the following paragraphs.

In general we can state that passive mode locking is more robust (i.e., operates with a faster build-up time and less effects from outside perturbations) when the laser is pumped as hard as possible, i.e., as many times over threshold as can be achieved with the available pump power. This can be understood in the sense that the laser can more quickly respond to changes in its intracavity intensity when pumped more times above threshold.

The effect of spatial hole burning also plays an important role in decreasing the self-starting threshold in passive mode locking. This effect is well described in B. Braun et al., "Continuous-wave mode-locked solid-state lasers with enhanced spatial hole-burning, Part I: Experiments,"

Applied Physics B, vol. 61, pp. 429–437, 1995. We provide a brief summary of the key points here.

First consider a laser cavity which for the moment is running in continuous-wave mode (i.e., the mode-locking element has been removed, but otherwise it is a typical laser cavity for mode-locked operation). Basically, for laser systems where the gain element is placed substantially at one end of the laser cavity, the frequency separation of the free-running laser modes due to the spatial hole-burning is substantially increased compared to laser systems where the gain is substantially away (at least a few centimeters typically) from the cavity end. For example, in a typical "gain-in-the-middle" laser system, the spacing of the free-running modes is only one or a few times the longitudinal mode-spacing (free-spectral range FSR of the cavity=c/2L), e.g., on the order of a few hundred megahertz in a typical mode-locked laser with a FSR of 100 MHz. In a typical "gain-at-the-end" laser system, the spacing of the free-running laser modes is many times the FSR of the cavity, typically 100 to 200 times the FSR, e.g., approximately 20 GHz in a typical "gain-at-the-end" mode locked laser with a FSR of 100 MHz.

These "free-running longitudinal modes" can assist in the starting and build-up process in passive mode-locking. One can describe the process as follows. In an ideal, homogeneously-broadened laser (approximately similar to the "gain-in-the-middle" laser), the laser begins operating with a single (or a few closely-spaced) mode(s). After this mode strikes the saturable absorber, it is modulated such that other longitudinal modes are "seeded" and begin to grow. Each of these modes is in turn modulated and seeds other adjacent longitudinal modes. This process continues to grow, seeding more and more longitudinal modes, until it reaches a steady state when there is a balance reached between the modulation depth of the absorber and the fall-off in the gain of the laser transition for the modes farthest separated in frequency from the center of the laser transition. This steady-state also sets the final operating bandwidth of the mode-locked laser and thus the minimum operating pulse width.

However, in a "gain-at-the-end" laser, this mode-locking process is enhanced due to the initial widely-spaced free-running modes. Instead of starting with just one mode running, each of the free-running modes is modulated by the absorber, seeding adjacent laser modes, until these grow to overlap the other modes which started from a neighboring group. Because the mode locking process does not need to fill as much frequency space compared to the ideal homogeneously broadened case, the mode-locking build-up time is decreased, and the steady-state bandwidth of the system is increased, which results in shorter pulsewidths. This has been experimentally verified in the above Braun reference.

For high-repetition rate lasers, it is advantageous to use the "gain-at-the-end" effect to reduce the self-starting threshold, allowing the modulation depth of the absorber to be further decreased, and improving the threshold for the Q-switching according to Eq. (2).

It is also possible to design the frequency-spacing of the free-running modes in a "gain-at-the-end" cavity using the length and doping of the crystals, i.e. $\Delta f = c/2nl_g$, where $\Delta f$ is the frequency separation of the modes, c is the speed of light, n is the index of refraction of the crystal, and $l_g$ is the length of the crystal where the laser mode is located. It is then possible to design the mode-spacing to be a multiple of the FSR (i.e., repetition rate) of the laser cavity. This should further enhance the self-starting and passive mode locking due to a stronger overlap of the neighboring longitudinal modes. For example, it would be possible to design a 5 GHz repetition rate laser with a crystal length and doping chosen to give a free-running mode-spacing of substantially 20 GHz. This would mean that the fourth mode from a given free-running mode would substantially overlap another free-running mode, enhancing the mode-locking process. If this was chosen poorly, for example a free-running mode-spacing of 22.5 GHz, then the modes would not overlap until the eighth mode away from a given free-running mode. This technique may be especially useful as the laser repetition rate increases above the range of 10 GHz, where the self-starting and Q-switching criteria become more difficult, and where the repetition rate is approaching (within approximately a factor of two) of the free-running mode separation.

We typically use modulation depths in the range of 0.5% to 1% to achieve self-starting while still avoiding the Q-switching instability limit for lasers in the sub-gigahertz range. Optimization of the laser crystal for spatial hole burning to use the above effect will allow for reduced modulation depths from the SESAM and may allow for reliable self-starting with modulation depths substantially below 0.5%, which would be advantageous for repetition rates well above 1 GHz.

DESCRIPTION OF PREFERRED EMBODIMENTS

Figure 1:
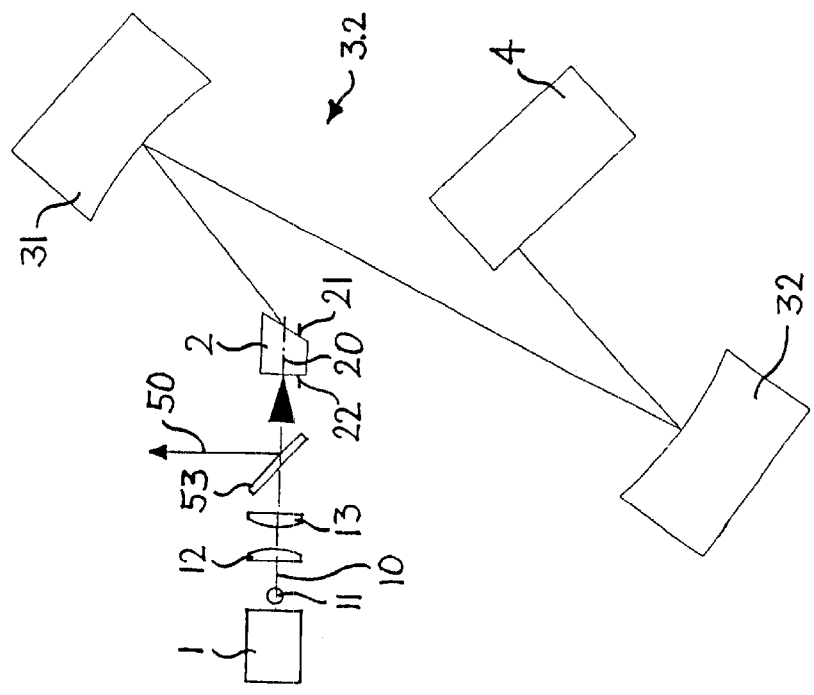
FIGS. 1 and 2 show two embodiments of a 2 GHz laser according to the invention.

In one embodiment, the invention uses a laser crystal of Nd:vanadate (Nd:YVO$_5$) pumped by a high-brightness diode laser and a SESAM device with less than 1% modulation depth. Referring to FIG. 1, a high-brightness diode laser 1 (Polaroid part No. 2000-808-BFY-BW-MCL), which emits 808 nm laser light 10 of up to 2 W from an aperture size of approximately 100 μm by 1 μm, is collimated in its highly divergent (sagittal) axis with a microlens 11. Then the light 10 is imaged through two achromatic lenses 12, 13 (focal lengths 100 mm and 50 mm, respectively), which focus the light down to a diameter of approximately 80 μm in the tangential plane and approximately 50 μm or less in the sagittal plane. At the focus of the light 10, approximately 1.2 W of pump power was measured at a pump wavelength of nominally 808 nm, which is then available for optically pumping a laser gain element. The pump diode laser 1 achieves maximum power at a drive current of 2.2 A, and begins to output light 10 at a threshold of 0.32 A.

A Nd:vanadate (containing 3% of Nd) laser crystal 2 is inserted close to the focus of the pump light. The crystal has dimensions of 3×3 mm² in cross section, with a nominal length of 4 mm along the center of the crystal in the direction of the optical axis 20. The optical axis 20 is normal to a flat 3×3 mm² back face 22, which has a standard optical dielectric coating providing for high transmission (HT) at the pump wavelength of 808 nm (transmission approximately 80% or higher) and is also highly reflective (HR) for the laser wavelength of 1064 nm (reflectivity greater than 99.9% typically). The front face 21 of the laser crystal 2 is cut and polished to form an angle nominally equal to Brewster's angle, in the tangential plane, which provides for an uncoated surface having very low optical loss (typically less than 0.1%). Nd:vanadate is a well-known laser crystal material and its properties can be found in data sheets from various companies such as VLOC, Tarpon Springs, Fla., USA, or Casix, Fujian, China.

A laser resonator cavity 3.1 is formed by the laser crystal 2 at one end, two concave curved folding mirrors 31, 32 and a SESAM device 4, which forms the other end of the laser cavity 3.1. By appropriately choosing the curvatures of the mirrors 31, 32 and the distances from the mirrors to the flat ends 21,401 of the cavity 3.1, it is possible to adjust the optical mode size in the laser crystal 2 and the optical mode size on the SESAM 4. This design procedure is using the well-known ABCD matrix technique described, e.g., in A. E. Siegman, Laser, Mill Valley (Calif.), University Science, 1986.

In one specific embodiment, we choose the first curved mirror 31 to have a radius of curvature of 25 mm, a reflectivity of 99.6% (allowing the laser beam to partially couple out of the cavity here) and the second mirror 32 to have a radius of curvature of 25 mm with a high reflectivity (R>99.9%). The distance from the front face 21 of the laser crystal 2 to the first mirror 31 is approximately 15 mm, the distance from the first mirror 31 to the second mirror 32 is 40 mm, and the distance from the second mirror 32 to the SESAM 4 is 8 mm. This gives a nominal total cavity length of approximately 71.6 mm (taken into account the effective length of the Nd:vanadate crystal 2, i.e., its index of refraction of n=2.15 times its length of 4 mm=8.6 mm) which corresponds to a nominal free spectral range (i.e., laser repetition rate) of 2.09 GHz.

The nominal design radius of the laser mode in the cavity is 25 µm by 50 µm in the Nd:vanadate crystal 2 (the asymmetry is due to a lengthening of the laser mode due to the Brewster-angled surface 21 on the crystal 2) and approximately 40 µm circular on the SESAM 4.

The first curved mirror 31 has a nominal reflectivity of 99.6%, which then allows for two beams 51, 52 to emerge from the laser cavity 3.1 with nominally equal output powers. In this configuration we typically achieved average output powers of 100 to 200 mW per output beam 51, 52 (i.e., 200 to 400 mW total output power).

Figure 2:
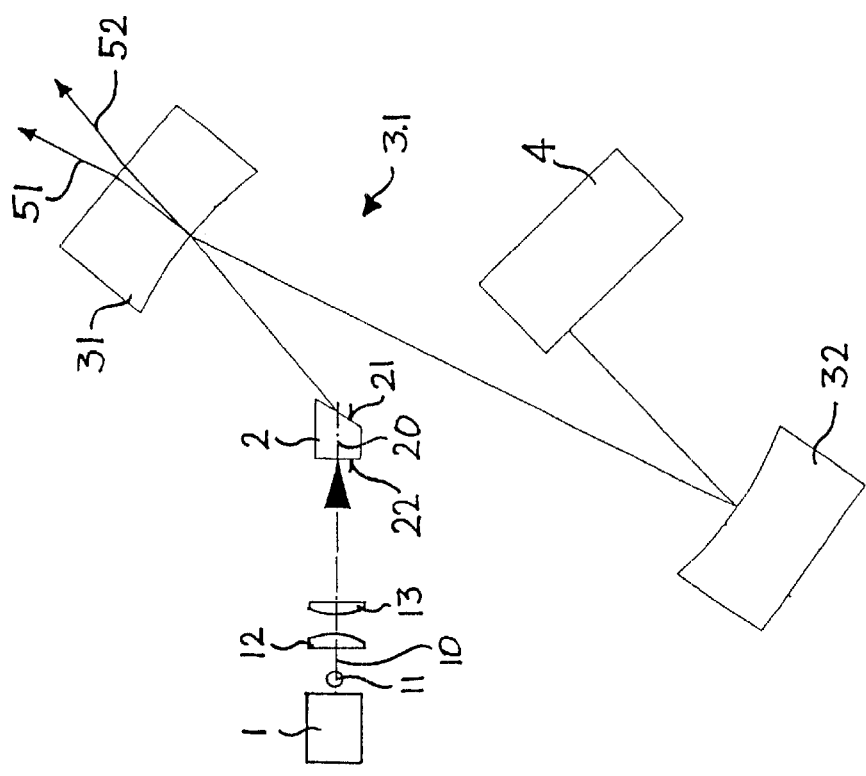

Note that it is not necessary to use the mirror 31 as the output coupler as shown in FIG. 1. It is both possible and desirable to have only one output beam 50 by designing the coating on the laser crystal 2 to transmit partially at the laser wavelength (cf. FIG. 11), and then to use a dichroic beam splitter 53 (i.e., a mirror which reflects almost 100% at the laser wavelength of 1064 nm but transmits, for example, more than 90% of the pump light 10 at 808 nm) to separate the laser output beam 50 and the pump beam 10. This embodiment of a laser according to the invention is shown in FIG. 2. We have tested this approach in similar configurations operating at more standard repetition rates of 100 MHz or 200 MHz, and determined that we can achieve approximately the same total average power as the embodiment of FIG. 1.

Figure 3:
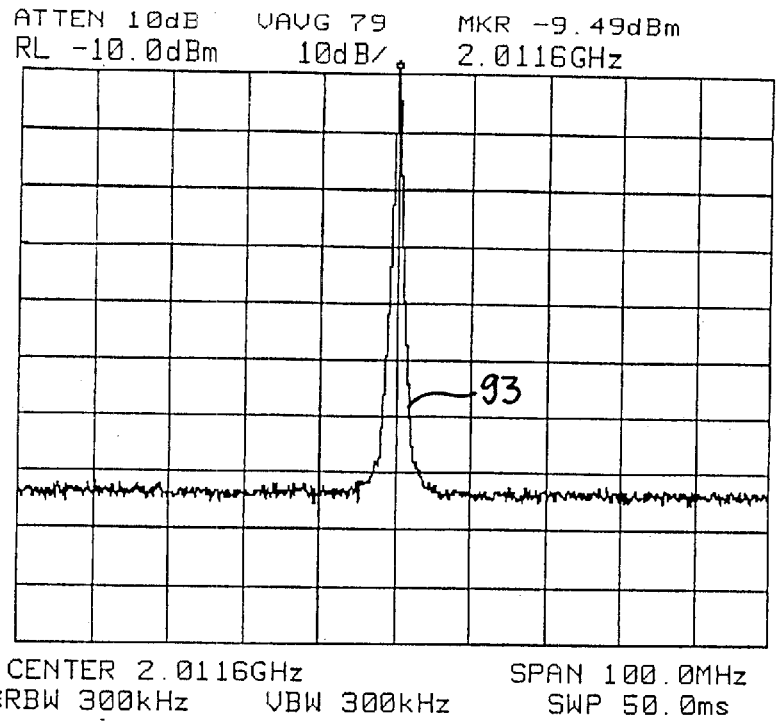
FIG. 3 shows a measured microwave spectrum of the laser of FIG. 1.
Figure 4:
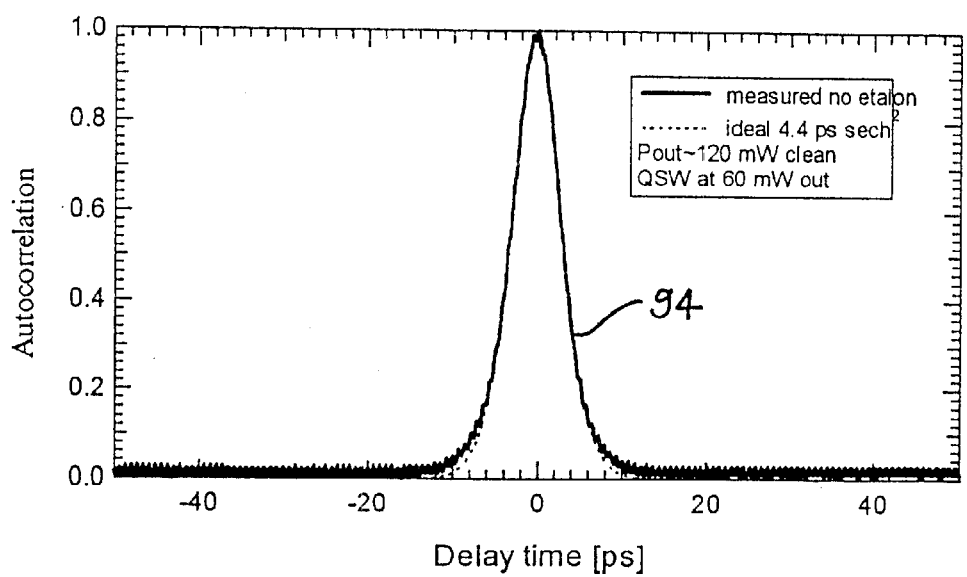
FIG. 4 shows the autocorrelation of the laser of FIG. 1.

When the components are properly positioned and aligned to achieve lasing with clean, lowest-order spatial mode (TEM$_{00}$), the laser begins to naturally mode-lock when it is pumped above a certain diode current level. FIG. 3 shows a microwave spectrum 93 measured for the laser of FIG. 1 with a photodiode going into a high-frequency microwave spectrum analyzer (Hewlett Packard HP8563E), and FIG. 4 shows the optical autocorrelation 94 indicating the temporal pulsewidth. The clean microwave signal at 2 GHz plus the optical autocorrelation indicates good mode locking at this repetition rate. Note that it is difficult to measure the time-domain waveform on traditional oscilloscopes, since most have bandwidths in the range of 100 MHz to 500 MHz. It is possible to have so-called sampling oscilloscopes with operation bandwidth up to approximately 50 GHz. These instruments then take periodic sampled measurements of a waveform, not continuous measurements.

Figure 5:
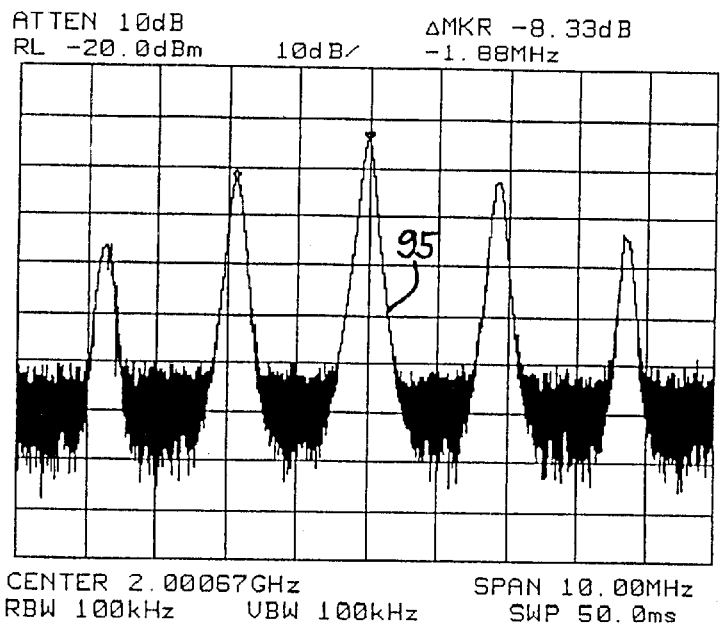
FIG. 5 shows a microwave spectrum showing Q-switching.

FIG. 5 shows the corresponding microwave spectrum 95 when the laser of FIG. 1 is operating in the Q-switched mode-locked regime. In this experiment, the threshold below which the laser Q-switched corresponded to a diode current of 0.6 A.

Figure 6:
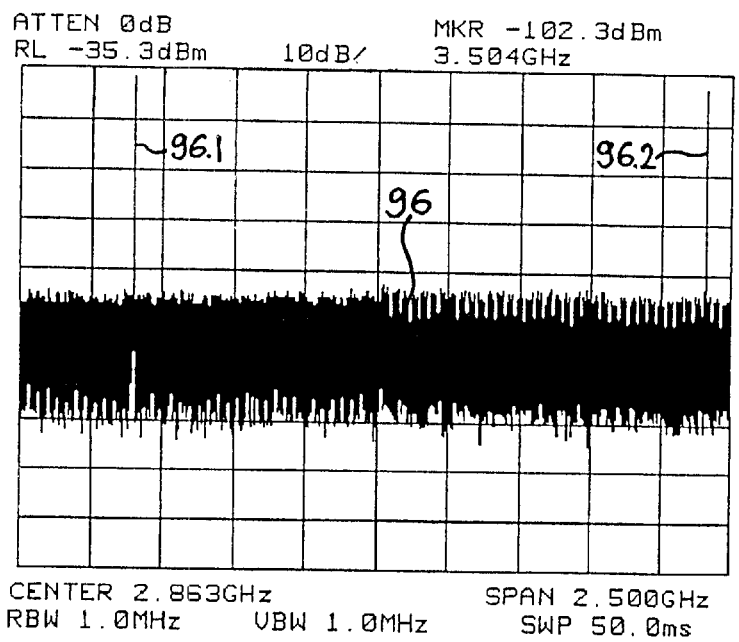
FIG. 6 shows a measured microwave spectrum of the laser of FIG. 1 showing the first and second harmonics.

In FIG. 6, a microwave spectrum 96 of the laser according to FIG. 1 is shown, however, at a 25 times higher span than in FIG. 3. In this presentation, the first harmonic 96.1 at 2 GHz and the second harmonic 96.2 at 4 GHz can be observed, indicating mode locking of the laser at a repetition rate of 2 GHz.

Figure 7:
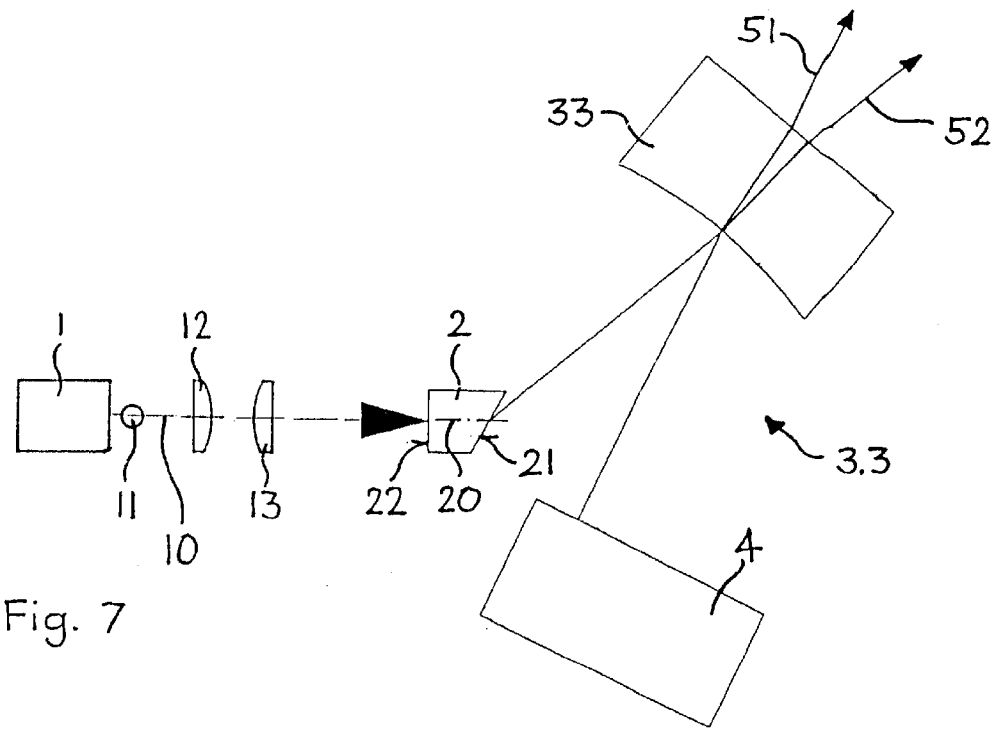
FIG. 7 shows a 4 GHz laser according to the invention.

The basic design described above can be scaled to higher frequencies. A design scaled to operate at nominally a frequency of 4 GHz is shown in FIG. 7. Instead of two curved mirrors 31, 32, only one curved mirror 33 is used, which also becomes important as the laser cavity 3.2 becomes physically smaller at higher repetition frequencies. The pump diode 1 and pump focusing optics 11–13 are essentially the same as in the 2 GHz laser set-up of FIG. 1. In this particular embodiment, a similar 3×3×4 mm³ Nd:vanadate crystal 2, a curved mirror 33 with a radius of 18 mm and a reflectivity of 99.8%, and a distance from the laser crystal 2 to the mirror 33 of 15 mm and from the mirror 33 to the SESAM 4 of approximately 16 mm is provided. The overall cavity length is approximately 39.6 mm giving an expected repetition rate of 3.78 GHz. With this configuration we achieved mode locking at a repetition rate of approximately 3.8 GHz and an output power of approximately 40 mW each in two beams 51, 52.

Figure 8:
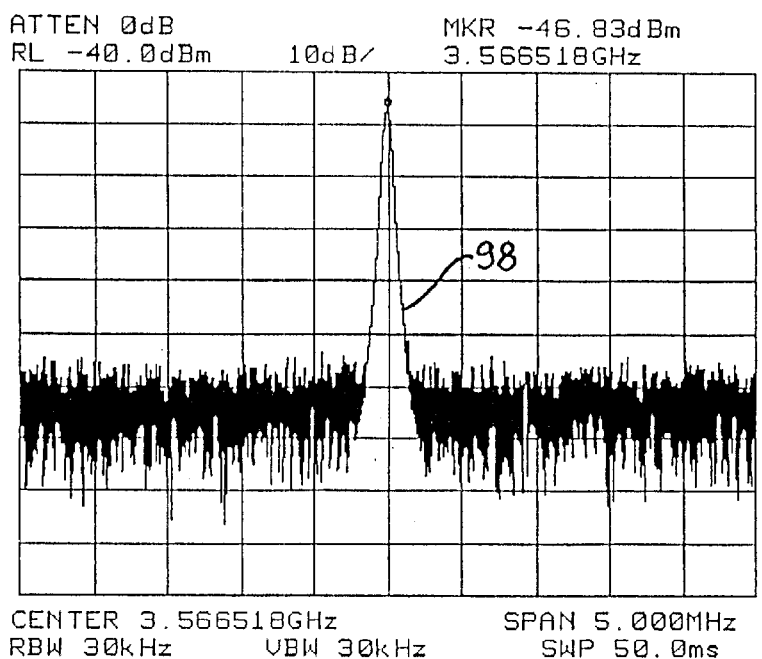
FIG. 8 shows a microwave spectrum of the laser of FIG. 6.

FIG. 8 shows the microwave spectrum 98 of the laser of FIG. 7. A repetition rate of 3.6 GHz was observed.

Figure 9:
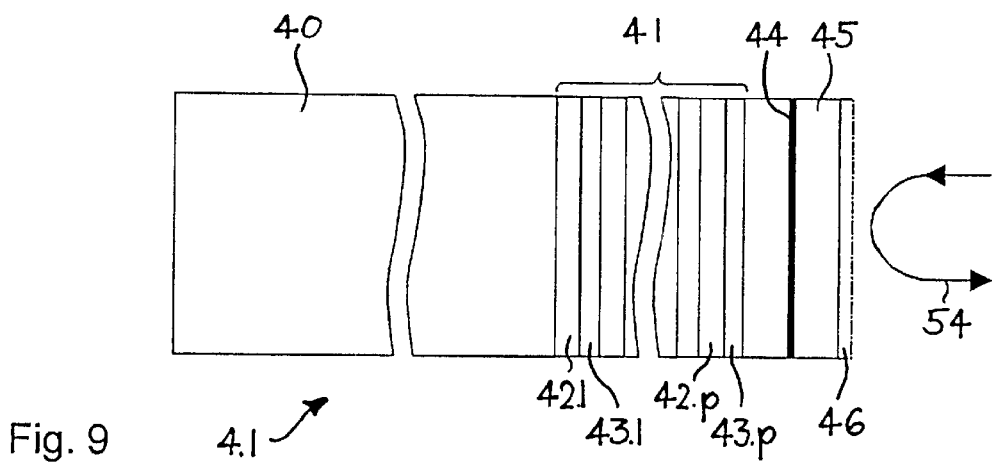
FIGS. 9–11 show three possible SESAM designs for lasers according to the invention.
Figure 10:
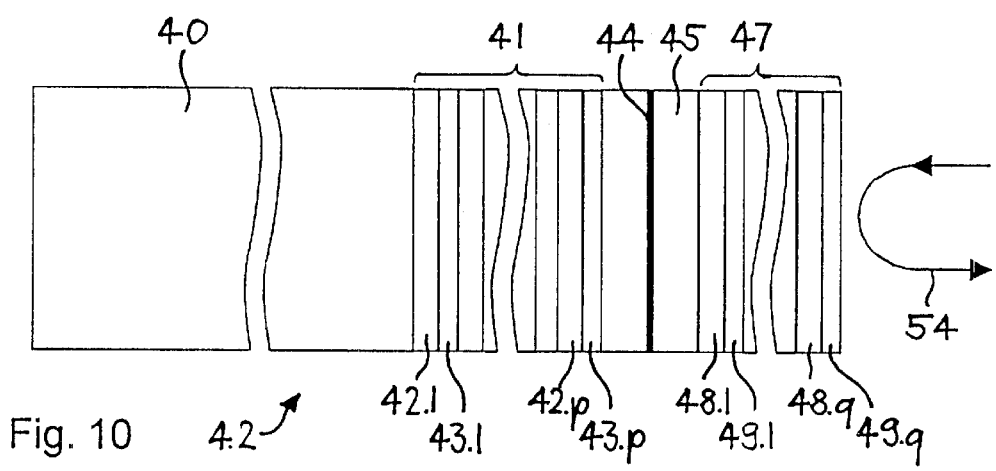
Figure 11:
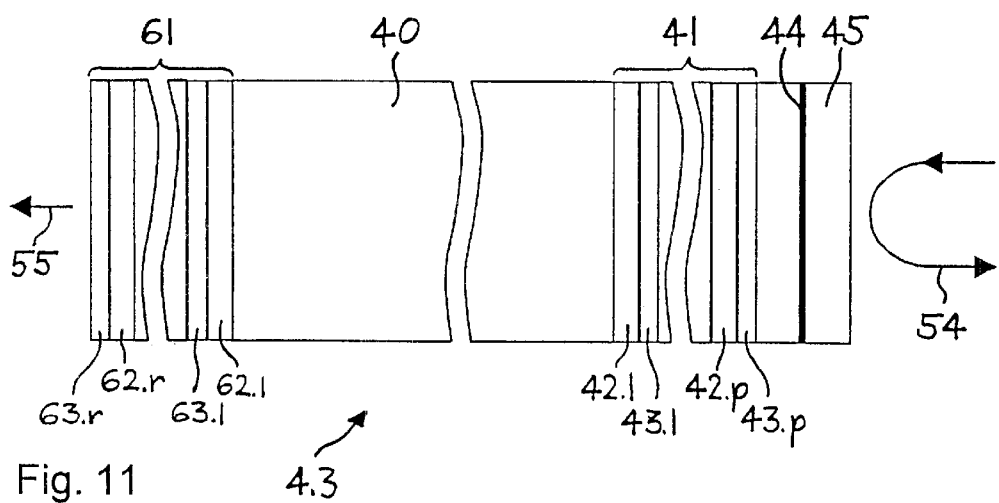

Various SESAM designs are possible. Three exemplified designs of SESAMs 4.1–4.3 are shown in FIGS. 9, 10 and 11, respectively. The first design, shown in FIG. 9, consists of a dielectric stack mirror 41 (typically called a Bragg reflector) consisting of quarter-wave pairs of low-index/high-index material 42.1, . . . , 42.p and 43.1, . . . , 43.p, respectively. These mirrors 41 are well known to those skilled in the art of mirrors. The specific design starts with of a gallium arsenide (GaAs) substrate 40 of approximately 400 µm thickness. First a quarter wave layer 42.1 of a low-index material, in this case aluminum arsenide (AlAs) with an index of refraction of n=2.95 and a thickness of approximately 80 nm (corresponding to a quarter wavelength of 1064 nm in the AlAs), is deposited onto the substrate 40. The deposition method is typically the well-established techniques of molecular beam epitaxy (MBE) or metal-organic chemical vapor deposition (MOCVD). A high-index layer 43.1 consisting of gallium arsenide (GaAs) with a refractive index of n=3.49 and a quarter-wave thickness of 76 nm is then deposited. Typically this is repeated approximately p=25 times (i.e., 25 times a low-index/high-index pair). Such a Bragg mirror 41 gives a reflectivity of typically higher than 99.5% and preferably higher than 99.9% at the center of its design wavelength. A reflection of incoming light is schematically depicted by an arrow 54.

Then an absorber layer 44 is deposited into a transparent half-wave spacer layer 45 on top of the Bragg mirror 41. The transparent half-wave spacer layer 45 does not substantially modify the reflectivity or wavelength range of the Bragg mirror 41. This design is referred to as a "low-finesse" design, since there is no Fabry-Perot mirror element above the spacer layer 45. In one specific embodiment, the absorber layer 44 is indium gallium arsenide ($In_xGa_{1-x}As$), where the ratio x of the indium is 25% and the ratio of the gallium is 1−x=75%. This sets the absorption bandgap of the semiconductor absorber layer 44 to substantially 1064 nm. The thickness of the absorber layer 44 sets the total amount of change in absorption (i.e., the modulation depth $\Delta R$) of the SESAM device 4.1. In our described example, the InGaAs absorber layer 44 is approximately 15 nm thick, and the half-wave spacer layer 45 consisting of GaAs has a total thickness of 155 nm including the 15 nm thickness of the absorber layer 44. Note that the different index of refraction of the absorber layer 44 compared to the spacer layer 45 and its thickness have to be taken into account for designing the completed half-wave layer thickness, although for most designs this slight difference is negligible.

The absorber layer 44 can be positioned at an arbitrary point in the electric field of the optical beam within the Bragg reflector 41, by selecting the position of the absorber layer 44 within the half-wave layer 45. Typically the electric field in the half-wave layer 45 starts at substantially zero at one end, increases to a maximum in the middle, then decreases down to substantially zero at the exit surface. By positioning the absorber layer 44 substantially in the middle of the half-wave layer 45, we achieve maximum saturation of the absorber 44 for a given incident optical intensity, and we also achieve a minimum effective saturation fluence for the SESAM 4.1. However it can be desirable to reduce the modulation depth of the device 4.1 by positioning the absorber layer 44 closer to either end of the half-wave spacer layer 45. If the absorber layer 44 is positioned effectively at a very end of the half-wave spacer layer 45, the electric field strength approaches zero, and the modulation depth and effective saturation of the absorber 44 also approach zero.

It is worth noting that the absorber layer thickness is approaching a value where quantum-well effects can be measured. If there is a measurable exciton, this can be tuned by temperature to optimize the saturation fluence of the absorber layer 44. Note however that quantum well effects are not essential for proper SESAM operation, and the absorber layer thickness is a parameter chosen to achieve a desired modulation depth $\Delta R$.

It may be desirable to passivate and protect the surface of the semiconductor spacer layer 45, i.e., to prevent contaminants and oxidants from possibly degrading the optical qualities of the semiconductor material. In this case, it is possible to put a very thin layer 46 of a material such as silicon (Si) directly on the top of the last semiconductor layer 45. If this passivation (or protection) layer 46 is very thin, it does not substantially change the optical properties of the SESAM device 4.1. However it will sufficiently protect and passivate the top surface. For example, several nanometers (typically 2 to 20 nm, preferably 2 to 4 nm) of silicon can be directly deposited on the top surface of the SESAM 4.1 after it has been fabricated in an MBE or MOCVD system. This coating step can be done in the same system before the SESAM device 4.1 has been removed from the coating chamber (which is under high vacuum) and before it has been exposed to possible contaminants and oxidants (oxygen and water vapor in room air, for example). The passivation layer 46 lets us operate the SESAM device 4.1 at higher optical intensities before damage occurs, which in turn facilitates achieving higher repetition rate mode locking as described by Eq. (1), by improving the fluence ratio on the SESAM device 4.1.

FIG. 10 shows a second variation of many possible SESAM designs. In this example, additional pairs of quarter-wave layers 48.1, ..., 48.q, 49.1, ..., 49.q of low and high refractive index, respectively, are added on top of the semiconductor 46 so as to form a top mirror 47. The resulting device is referred to as a "high-finesse" SESAM 4.2 due to the Fabry-Perot structure formed between the top mirror 47 and the bottom mirror 41. The Fabry-Perot structure reduces the strength of the optical field in the absorber layer 44, reducing the modulation depth compared to the previous example of FIG. 9 (for the same absorber thickness). In this example the low-index layers 48.1, ..., 48.q consist of the standard quarter-wave layers of silicon dioxide ($SiO_2$, n=1.45) and the high-index layers 49.1, ..., 49.q of the standard quarter-wave layers of titanium dioxide ($TiO_2$, n=2.25). Another possible advantage of this design is that the dielectric material 48.1, ..., 48.q, 49.1, ..., 49.q has a higher damage threshold than the semiconductor material 45, and also it passivates and protects the semiconductor surface.

Note that there are other ways to passivate the surface of the semiconductor 45 than adding more dielectric layers. One possibility is coating the surface of the semiconductor 46 with a thin silicon layer 46, as described with reference to FIG. 9. This may be advantageous when it is desired to keep the modulation depth larger and/or the saturation fluence as small as possible, which facilitates mode-locking at higher repetition rates as described by Eq. (1).

The SESAM devices 4.1, 4.2 of FIGS. 9 and 10 are designed for use as reflectors with high reflectivity, as in FIGS. 1, 2 and 7. It is also possible to design the bottom Bragg reflector 41 of any SESAM device to have any desired reflectivity less than the typical high reflector value of 99.5% or 99.9%. Since the substrate 40 of the SESAM is typically gallium arsenide, the typical laser wavelength of 1064 nm is substantially transmitted through the substrate 40. As such the SESAM 4 can also be designed as an output coupler, which can reduce the complexity of the system by eliminating the dichroic beam-splitter between the pump diode and the laser crystal. FIG. 11 shows an example of a SESAM 4.3 designed for use as an output coupler. The structure of this third SESAM embodiment 4.3 is similar to the one shown in FIG. 9, except of the following differences. Instead of a high reflectivity of higher than 99.5%, the Bragg reflector 41 of this output coupler SESAM 4.3 is adjusted to have a relatively low reflectivity of typically lower than 99.5%. In addition, an antireflection coating 61 is applied to the opposite end surface of the GaAs substrate 40 to reduce the large unwanted Fresnel reflection at this interface. The standard antireflection coating 61 typically consists of a stack of low-index/high index pairs 62.1, ..., 62.r and 63.1, ..., 63.r, respectively, and is well-known in the art of optical coatings. Transmitted light is schematically depicted by an arrow 55.

Figure 12:
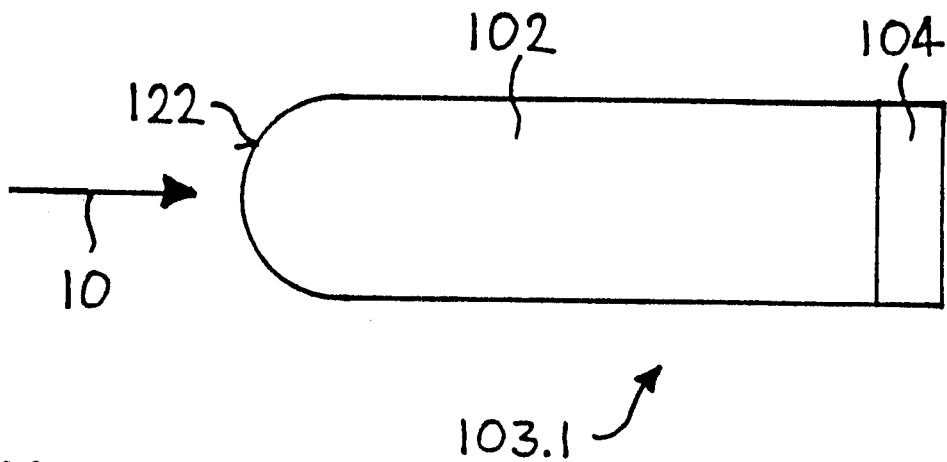
FIGS. 12 and 13 show two possible designs for quasi-monolithic laser cavities for a laser according to the invention.

The laser cavities 3.1, 3.2 described above were demonstrated using discrete components in a laboratory environment. However, it is also possible to design even more simple systems which become quasi-monolithic. Here advantage is taken of the fact that the high refractive index of the Nd:vanadate can be used to shorten the physical length of the laser cavity. FIG. 12 shows a quasi-monolithic cavity 103.1 designed for 4 GHz repetition rate. In one embodiment, one end 122 of a Nd:vanadate laser crystal 102 can be polished to have a curvature. This curvature can be chosen to set the size of the optical mode in the cavity 103.1 and the size on a SESAM 104. Although this cavity 103.1 has less design flexibility than the previous cavities 3.1, 3.2, it is still possible to achieve the conditions necessary for mode-locking based on the Eq. (1). In addition, the modulation depth of the SESAM 104 can be independently adjusted as described previously, if necessary.

Figure 13:
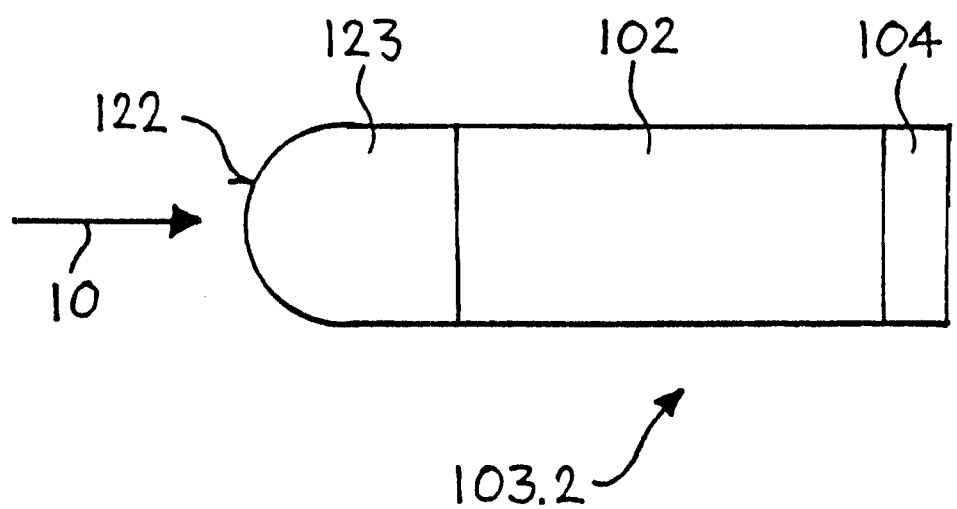

Note that there are several possible significant variations of this quasi-monolithic design. First, the curved surface 122 could be omitted and replaced by a flat surface, if there is enough thermal lensing at a given pump power to form a stable laser mode with the proper mode size. This change may make the manufacture of the laser crystal more simple and at lower cost. Secondly, it may be desirable to replace part of the doped Nd:vanadate crystal 102 with an undoped vanadate crystal 123 on one end of the cavity 103.2 as indicated in FIG. 13. This should allow for higher pump powers and correspondingly higher output powers. The undoped piece 123 of vanadate can be bonded directly to the doped piece 102 using the well-known technique of diffusion bonding, which results in a mechanically strong and optically clean interface. This undoped piece 123 then acts as a better heat sink for the doped crystal 102 where the pump power is absorbed, reducing the temperature gradient and temperature rise. In addition, the mechanical pressure from the contacted crystal reduces the thermally induced bulging of the doped crystal 102 due to the heating from the pump. This reduces the thermally induced lensing in the laser crystal 102 allowing for pumping to higher powers compared to the configuration 103.1 shown in FIG. 12.

Note that it should also be possible to bond the SESAM device 104 directly onto the Nd:vanadate laser crystal 102 with a technique such as diffusion bonding. This further facilitates reducing the size of the cavity and making the system more robust mechanically.

It is also possible to design cavities that operate at even higher frequencies. The cavity designs 103.1, 103.2 of FIGS. 12 or 13 can be readily scaled to shorter lengths and appropriately smaller curvatures on the curved ends 122 to set the laser mode size; by such a scaling, correspondingly higher repetition rates can be achieved. Repetition rates of 10 GHz and higher should be possible with this approach, as long as the conditions of Eq. (1) are met. Calculations show that this can be realized with the diode lasers available currently and with optimized SESAM designs.

What is claimed is:

1. A laser for emitting a continuous-wave train of electromagnetic-radiation pulses characterized by an effective wavelength, the fundamental repetition rate of the emitted pulses exceeding 1 GHz, said laser comprising:

an optical resonator;

a solid-state laser gain element placed inside said optical resonator;

means for exciting said solid-state laser gain element to emit electromagnetic radiation characterized by the effective wavelength; and means for passive mode-locking comprising a saturable absorber, wherein the pumping power of the means for exciting said laser gain element to emit electromagnetic radiation and the design and the output coupling value of said optical resonator are chosen such that the product $(F_{laser}/F_{sat,laser}) \times (F_{abs}/F_{sat,abs}) > \Delta R$, where $F_{laser}$ is the fluence in the laser material, $F_{sat,laser} = h\upsilon/\sigma_{laser}$ is the saturation fluence of the laser material, h is Planck's constant, $\upsilon$ is the center laser frequency, $\sigma_{laser}$ is the laser cross-section parameter, $F_{abs}$ is the fluence on the absorber device, $F_{sat,abs} = h\upsilon/\sigma_{abs-eff}$ is the effective saturation fluence of the absorber, where $\sigma_{abs-eff}$ is the effective cross-section parameter of said absorber, and $\Delta R$ is the modulation depth of said absorber.

2. The laser according to claim 1 wherein said means for exciting said laser gain element to emit electromagnetic radiation comprise a semiconductor diode laser.

3. The laser according to claim 1 wherein said laser gain element consists of a laser material with a stimulated emission cross section exceeding $0.8 \times 10_{-18}$ cm$^2$ at the effective wavelength.

4. The laser according to claim 3 wherein said laser gain element is made of Nd:vanadate.

5. The laser according to claim 1 wherein said saturable absorber is a semiconductor saturable absorber mirror device.

6. The laser according to claim 5 wherein said saturable absorber mirror device does not comprise a Fabry-Perot mirror element whereby it has a low-finesse design.

7. The laser according to claim 6 wherein the saturable absorber mirror device has a modulation depth of less than 1% and preferably less than 0.5%.

8. The laser according to claim 5 wherein said saturable absorber mirror device comprises a Fabry-Perot mirror element whereby it has a high-finesse design.

9. The laser according to claim 5 wherein said saturable absorber mirror device is an output coupler for outcoupling the electromagnetic-radiation pulses from said optical resonator.

10. The laser according to claim 5 wherein said saturable absorber mirror device is bonded directly to one end of the laser gain element.

11. The laser according to claim 5 comprising means for tuning said semiconductor saturable absorber mirror device for an optimal modulation depth by temperature.

12. The laser according to claim 1 wherein said optical resonator is delimited by a first and a second end and said laser gain element is placed at one end such that spatial hole burning enhances the self-starting threshold and reduces mode-locking build-up time.

13. The laser according to claim 12 wherein the length of said laser gain element is chosen so that the free-running longitudinal mode spacing due to the spatial hole burning is an integer multiple of the laser repetition rate set by the free spectral range of said optical resonator.

14. A laser for emitting a continuous-wave train of electromagnetic-radiation pulses characterized by an effective wavelength, the fundamental repetition rate of the emitted pulses exceeding 1 GHz, said laser comprising:

an optical resonator;

a solid-state laser gain element placed inside said optical resonator;

means for exciting said laser gain element to emit electromagnetic radiation characterized by the effective wavelength; and means for passive modelocking comprising a semiconductor saturable absorber mirror device having a modulation depth of less than 1% and preferably less than 0.5%.

15. A laser for emitting a continuous-wave train of electromagnetic-radiation pulses characterized by an effective wavelength, the fundamental repetition rate of the emitted pulses exceeding 1 GHz, said laser comprising:

an optical resonator being delimited by a first and a second end;

a solid-state laser gain element placed inside said optical;

means for exciting said laser gain element to emit electromagnetic radiation characterized by the effective wavelength; and means for passive modelocking comprising a saturable absorber, wherein said laser gain element is placed at one end such that spatial hole burning enhances the self-starting threshold and reduces mode-locking build-up time.

16. The laser according to claim 15 wherein the length of said laser gain element is chosen so that the free-running longitudinal mode spacing due to the spatial hole burning is an integer multiple of the laser repetition rate set by the free spectral range of said optical resonator.

17. A method for emitting a continuous-wave train of electromagnetic-radiation pulses characterized by an effective wavelength, the pulses being emitted with a fundamental repetition rate exceeding 1 GHz, comprising the steps of:

exciting a solid state laser gain element to emit electromagnetic radiation characterized by the effective wavelength, said laser gain element being placed inside an optical resonator;

recirculating said electromagnetic radiation in said optical resonator; and passively mode-locking said electromagnetic radiation using a saturable absorber, wherein pumping power of said means for exciting said laser gain element and the design and the output coupling value of the laser cavity are chosen such that the product $(F_{laser}/F_{sat,laser}) \times (F_{abs}/F_{sat,abs}) > \Delta R$, where $F_{laser}$ is the fluence in the laser material, $F_{sat,laser} = h\nu/\sigma_{laser}$ is the saturation fluence of the laser material, h is Planck's constant, $\nu$ is the center laser frequency, $\sigma_{laser}$ is the laser cross-section parameter, $F_{abs}$ is the fluence on the absorber device, $F_{sat,abs} = h\nu/\sigma_{abs-eff}$ is the effective saturation fluence of the absorber, where $\sigma_{abs-eff}$ is the effective cross-section parameter of the absorber device, and $\Delta R$ is the modulation depth of the absorber device.

18. The method according to claim 17 wherein said means for exciting said laser gain material to emit electromagnetic radiation comprise a semiconductor diode laser.

19. The method according to claim 17 wherein said laser gain element consists of a laser material with a stimulated emission cross section exceeding $0.8 \times 10^{-18}$ cm$^2$ at the effective wavelength.

20. The method according to claim 19 wherein said laser gain element is made of Nd:vanadate.

21. The method according to claim 17 wherein said saturable absorber is chosen to be a semiconductor saturable absorber mirror device.

22. The method according to claim 21 wherein said saturable absorber mirror device does not comprise a Fabry-Perot mirror element whereby has a low-finesse design.

23. The method according to claim 22 wherein the saturable absorber mirror device is chosen to have a modulation depth of less than 1% and preferably less than 0.5%.

24. The method according to claim 17 wherein said saturable absorber mirror device comprises a Fabry-Perot mirror element whereby has a high-finesse design.

25. The method according to claim 17 wherein said saturable absorber mirror device is an output coupler for outcoupling the electromagnetic-radiation pulses from said optical resonator.

26. The method according to claim 17 wherein said saturable absorber mirror device is bonded directly to one end of the laser gain element.

27. The method according to claim 21 wherein said semiconductor saturable absorber mirror device is tuned by temperature for an optimal modulation depth.

28. The method according to claim 21 wherein said means for exciting said laser gain element to emit electromagnetic radiation comprises a semiconductor diode laser.

29. The method according to claim 17 wherein said optical resonator is delimited by a first and a second end and said laser gain element is placed at one end such that spatial hole burning enhances the self-starting threshold and reduces mode-locking build-up time.

30. The method according to claim 29 wherein the length of said laser gain element is chosen so that the free-running longitudinal mode spacing due to the spatial hole burning is an integer multiple of the laser repetition rate set by the free spectral range of said optical resonator.

31. A method for emitting a continuous-wave train of electromagnetic-radiation pulses characterized by an effective wavelength, the pulses being emitted with a fundamental repetition rate exceeding 1 GHz, comprising the steps of:

exciting a solid state laser gain element to emit electromagnetic radiation characterized by the effective wavelength, said solid state laser gain element consisting of a laser material with a stimulated emission cross section exceeding $0.8 \times 10^{-18}$ cm$^2$ at the effective wavelength, said laser gain element being placed inside an optical resonator;

recirculating said electromagnetic radiation in said optical resonator; and passively modelocking said electromagnetic radiation using a semiconductor saturable absorber mirror device having a modulation depth of less than 1% and preferably less than 0.5%.

32. A method for emitting a continuous-wave train of electromagnetic-radiation pulses characterized by an effective wavelength, the pulses being emitted with a fundamental repetition rate exceeding 1 GHz, comprising the steps of:

exciting a laser gain element to emit electromagnetic radiation characterized by the effective wavelength, said laser gain element being placed inside an optical resonator delimited by a first and a second end;

recirculating said electromagnetic radiation in said optical resonator; and passively modelocking said electromagnetic radiation using a saturable absorber, wherein said laser gain element is placed at one end of said optical resonator such that spatial hole burning enhances the self-starting threshold and reduces mode-locking build-up time.

33. The method according to claim 32 wherein the length of said laser gain element is chosen so that the free-running longitudinal mode spacing due to the spatial hole burning is an integer multiple of the laser repetition rate set by the free spectral range of said optical resonator.

* * * * *